(12) United States Patent
Lundstrom

(10) Patent No.: US 9,885,392 B2
(45) Date of Patent: Feb. 6, 2018

(54) SHUT OFF VALVE IN A HYDRAULIC DISC COUPLING FOR AN AWD VEHICLE

(71) Applicant: BorgWarner TorqTransfer Systems AB, Landskrona (SE)

(72) Inventor: Bo Lundstrom, Glumslov (SE)

(73) Assignee: BorgWarner Torq Transfer Systems AB, Landskrona (SE)

( * ) Notice: Subject to any disclaimer, the term of this patent is extended or adjusted under 35 U.S.C. 154(b) by 0 days.

(21) Appl. No.: 14/770,010

(22) PCT Filed: Feb. 6, 2014

(86) PCT No.: PCT/SE2014/050151
§ 371 (c)(1),
(2) Date: Aug. 24, 2015

(87) PCT Pub. No.: WO2014/133434
PCT Pub. Date: Sep. 4, 2014

(65) Prior Publication Data
US 2016/0010698 A1    Jan. 14, 2016

(30) Foreign Application Priority Data

Feb. 28, 2013    (SE) ........................................ 1350238

(51) Int. Cl.
*F16K 31/12* (2006.01)
*F16D 25/12* (2006.01)
(Continued)

(52) U.S. Cl.
CPC ....... *F16D 25/123* (2013.01); *F16D 25/0638* (2013.01); *F16D 48/02* (2013.01);
(Continued)

(58) Field of Classification Search
CPC ................... F16D 25/123; F16D 48/02; F16D 2048/0245; F16D 2048/0263;
(Continued)

(56) References Cited

U.S. PATENT DOCUMENTS 843,391 A * 2/1907 Ferris .................... F16K 31/122
251/63
2,669,256 A * 2/1954 Rampton .............. F15B 11/128
137/499

(Continued)

FOREIGN PATENT DOCUMENTS

CN    101796300 A    8/2010
DE     356366 C     7/1922
(Continued)

OTHER PUBLICATIONS

Chinese Office Action dated Jan. 9, 2017 ; Application No. 201480010912.5; Applicant: BorgWarner TorqTransfer Systems AB.; 9 pages.

(Continued)

*Primary Examiner* — Craig Schneider
*Assistant Examiner* — P. Macade Nichols
(74) *Attorney, Agent, or Firm* — BrooksGroup

(57) ABSTRACT

A shut-off valve for shutting-off a supply at will, wherein the shut-off valve comprises an axially movable valve slide, provided with a transverse valve flange for cooperation with a fixed valve seat, the slide being actuatable in a closing direction by spring force and in an opening direction by a hydraulically operated ball, having an actuation end position in a sealing ball seat.

7 Claims, 4 Drawing Sheets

(51) Int. Cl.
*F16D 25/0638* (2006.01)
*F16K 3/02* (2006.01)
*F16D 48/02* (2006.01)

(52) U.S. Cl.
CPC ............ *F16K 3/0254* (2013.01); *F16K 31/12* (2013.01); *F16D 2048/029* (2013.01); *F16D 2048/0221* (2013.01); *F16D 2048/0245* (2013.01); *F16D 2048/0263* (2013.01); *F16D 2048/0284* (2013.01)

(58) Field of Classification Search
CPC ....... F16D 2048/029; F16D 2048/0284; F16D 2048/0221; F16K 31/12
USPC ...... 192/70.12; 251/62–63.6; 137/539, 539.5
See application file for complete search history.

(56) References Cited

U.S. PATENT DOCUMENTS

| | | | | |
|---|---|---|---|---|
| 2,811,958 | A * | 11/1957 | Roush, Jr. ............... | F01B 11/00 123/46 R |
| 2,985,141 | A * | 5/1961 | Gustafson ........... | F15B 13/0438 137/625.62 |
| 3,706,323 | A * | 12/1972 | Hayner ..................... | F16K 1/14 137/489 |
| 3,811,279 | A * | 5/1974 | Vogeli ................... | F01D 17/145 251/63.5 |
| 4,368,918 | A * | 1/1983 | Droscher ................ | E21C 35/22 173/58 |
| 4,541,607 | A * | 9/1985 | Hotger ..................... | F16K 1/14 137/901 |
| 5,653,419 | A * | 8/1997 | Uchisawa ............... | F16K 31/54 251/250 |
| 6,729,600 | B2 * | 5/2004 | Mattes ................... | F02M 45/04 251/186 |
| 2003/0111622 | A1 | 6/2003 | Jahn et al. | |
| 2003/0230461 | A1 * | 12/2003 | Sakata ................ | F16D 25/0638 192/70.12 |
| 2004/0159523 | A1 | 8/2004 | Duan et al. | |
| 2005/0061372 | A1 * | 3/2005 | McGrath .............. | F02M 69/465 137/539.5 |
| 2014/0008172 | A1 * | 1/2014 | Lundstrom ............. | F16D 48/02 192/70.12 |
| 2016/0010698 | A1 * | 1/2016 | Lundstrom ......... | F16D 25/0638 251/28 |
| 2016/0010706 | A1 * | 1/2016 | Lundstrom ............. | F16D 25/14 192/85.01 |

FOREIGN PATENT DOCUMENTS

| | | |
|---|---|---|
| DE | 3935398 A1 | 4/1991 |
| DE | 20311361 U1 | 9/2003 |
| EP | 0293321 A2 | 11/1988 |
| EP | 1158231 A2 | 11/2001 |
| GB | 753516 A | 7/1956 |
| GB | 995607 A | 6/1965 |
| GB | 2147692 A | 5/1985 |
| JP | 20081965200 A | 8/2008 |
| WO | 2011043722 A1 | 4/2011 |
| WO | 2012125096 A1 | 9/2012 |

OTHER PUBLICATIONS

Extended European Search Report dated Sep. 28, 2016 ;Application No. 14757709.2-1756/2962004 ; Applicant: BorgWarner TorqTransfer Systems AB;7 pages.

Chinese Office Action dated Oct. 10, 2017; Application No. 201480010912.5; Applicant: BorgWarner TorqTransfer Systems AB; 10 pages.

* cited by examiner

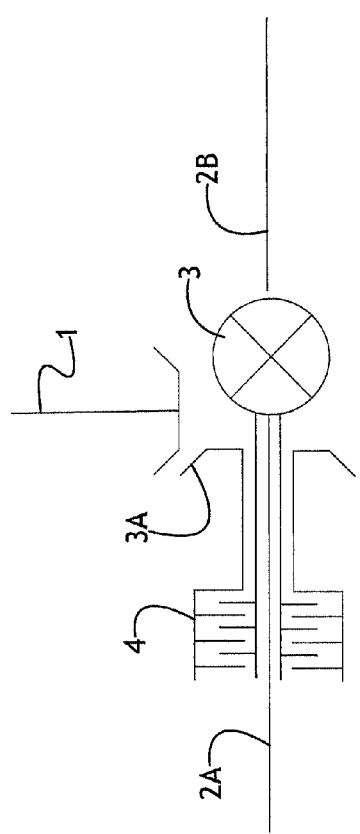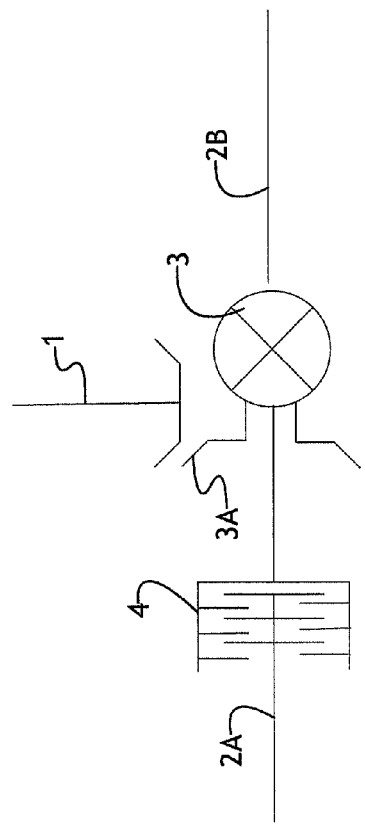

SHUT OFF VALVE IN A HYDRAULIC DISC COUPLING FOR AN AWD VEHICLE

This application claims the benefit of Swedish Application No. 1350238-0 filed Feb. 28, 2013 and PCT Application No. SE2014/050151 filed Feb. 6, 2014.

TECHNICAL FIELD

The present invention relates to a shut-off valve in a hydraulic disc coupling for an AWD vehicle, the coupling having means for supplying cooling and lubricating oil to the disc package of the coupling, said means including the shut-off valve for shutting-off said supply at will.

BACKGROUND OF THE INVENTION

As is well known in the art, an AWD (All Wheel Drive) vehicle can be provided with at least one hydraulic disc coupling for distributing the driving torque from the vehicle engine to all of the vehicle wheels. Especially, such a coupling may be provided in the drive line between the front axle and the wheels of the rear axle, most often in the vicinity of the rear axle differential.

Sometimes, it may be desirable to use the AWD vehicle in a FWD (Forward Wheel Drive) mode. In this case the coupling is disconnected, i e its discs are separated from each other.

By operating the vehicle with the coupling in a disconnect mode, rotating masses in the vehicle are reduced, leading to a lower fuel consumption.

In a practical case a propeller shaft of the vehicle, possibly including one or two bevel gear transmissions, has a hydraulic disc coupling at one end and a simple coupling, for example a dog clutch, at the other end. In the disconnect mode both these couplings must be disconnected for obtaining the desired effect.

A pump actuator system is disclosed in WO 2011/043722. In such a system the supply of hydraulic oil to the coupling piston is governed by the rotative speed of a pump.

For obtaining the desired result in a disconnect mode, it may be of importance to reduce the drag torque within the disc package of the coupling by removing cooling and lubricating oil, that is supplied to the package in the connect mode.

A gravity lubrication system may be used. Such a system may comprise a side reservoir for cooling and lubricating oil, which is supplied by gravity to the disc package and returned to the side reservoir by forces created by rotating disc coupling parts.

A shut-off valve is provided to shut off the supply of oil in the disconnect mode and to reestablish the supply in the connect mode. The reestablishment is activated by hydraulic pressure controlling the coupling.

The use of a normal slide valve as the shut-off valve has certain disadvantages. These disadvantages also apply in a second use of a shut-off valve, namely in a normal AWD coupling system without any disconnect/connect function. In a stand-by mode of such a coupling it may be advantageous to reduce or eliminate drag losses due to oil splashes from rotating parts in the coupling.

A normal slide valve has a certain stroke and area. This means that a certain oil volume has to be branched-off to the shut-off valve from the control oil flow to the coupling, which negatively influences the coupling reaction time at the shift-over from disconnect to connect mode or from stand-by mode to torque transfer mode.

A certain hydraulic pressure must be reached to activate and move a normal slide valve against the forces from sealings and a return spring. In a slide valve the sealing is primarily used for preventing oil leakage at intermediate and high pressure ranges (where response times in the AWD mode can be influenced). The friction of the sealing necessitates a higher return spring force, which means that the minimum pressure rises for two reasons. A high minimum pressure level will restrict the lowest possible torque transfer of the coupling in a negative way.

Due to difficulties at the sealing manufacturing the diameter of the slide cannot be too small, as the friction then will be proportionally too high. This will be a disadvantage for the oil consumption mentioned above.

THE INVENTION

It is accordingly a main object of the invention to provide a shut-off valve without the mentioned and other disadvantages.

This is according to the invention accomplished in that the shut-off valve comprises an axially movable valve slide, provided with a transverse valve flange for cooperation with a fixed valve seat, the slide being actuatable in a closing direction by spring force and in an opening direction by a hydraulically operated ball, having an actuation end position in a sealing ball seat.

In a practical embodiment the valve slide may have a control pin for engagement with the ball.

A compression spring may be arranged to act on the valve slide in its axial direction.

The ball seat may preferably be arranged in a ball cage, threadingly engaged in a housing bore, in which the valve slide is arranged. The control pin may extend into the ball cage. The ball cage may be provided with a stop ring for holding the ball in the ball cage.

The ball can opposite the control pin be acted on by hydraulic pressure supplied through a housing bore.

BRIEF DESCRIPTION OF THE DRAWINGS

The invention will be described in further detail below under reference to the accompanying drawings, in which FIG. 1 is a schematic view of a first embodiment of a rear axle architecture with a disconnect coupling of an AWD vehicle, FIG. 2 is a corresponding view of a second embodiment.

DETAILED DESCRIPTION

A drive system of an AWD (All Wheel Drive) vehicle is well known in the art. Typical examples are shown in WO 2011/043722. Such a system has an engine, a front axle with a differential, an intermediate shaft or cardan shaft, and a rear axle with a differential. In order to distribute the torque not only to the front axle but also to the rear axle in accordance with the driving conditions, an electronically controlled wet disc coupling is arranged in the driveline to the rear axle, often in the intermediate shaft or otherwise close to the rear differential. This wet disc coupling will be further described below.

Two embodiments of rear axle architectures for an AWD vehicle are shown in FIGS. 1 and 2.

The first embodiment shown in FIG. 1 has the intermediate shaft 1, the rear axle 2 (axle halves 2A and 2B), the rear differential 3, and the wet disc coupling 4. The coupling 4 is arranged around the first rear axle half 2A functionally between a ring gear 3A and the housing of the differential 3.

The second embodiment shown in FIG. 2 contains the same members 1-4, but here the coupling 4 is situated in the first rear axle half 2A, providing the same result as the first embodiment.

Other embodiments are of course possible in an AWD vehicle.

The function of the coupling 4 when driving the vehicle in an AWD mode is described elsewhere, for example in the mentioned WO 2011/043722.

When it is desired to drive the AWD vehicle in an FWD (Forward Wheel Drive) mode, the disc coupling 4 is disconnected, i e its discs are separated for preventing them from transmitting any torque. The coupling 4 may be said to be in a disconnect mode. For enhancing this separation effect, the oil normally provided in the coupling 4 for lubricating and cooling its discs can be removed from the coupling. In order to reduce the acceleration of the rotating mass of the intermediate propelling shaft 1 and to eliminate the drag torque in bearings and sealings therefor, clutch means, preferably close to the front axle differential, may be provided to bring the intermediate shaft 1 to a standstill in FWD mode of the vehicle.

When the AWD mode of the vehicle is to be resumed, the requirement may be that the disc coupling 4 is fully operable within a time of 0.4-0.5 s or even less, i e that the discs of the coupling are brought into engagement with each other.

Figure 3:
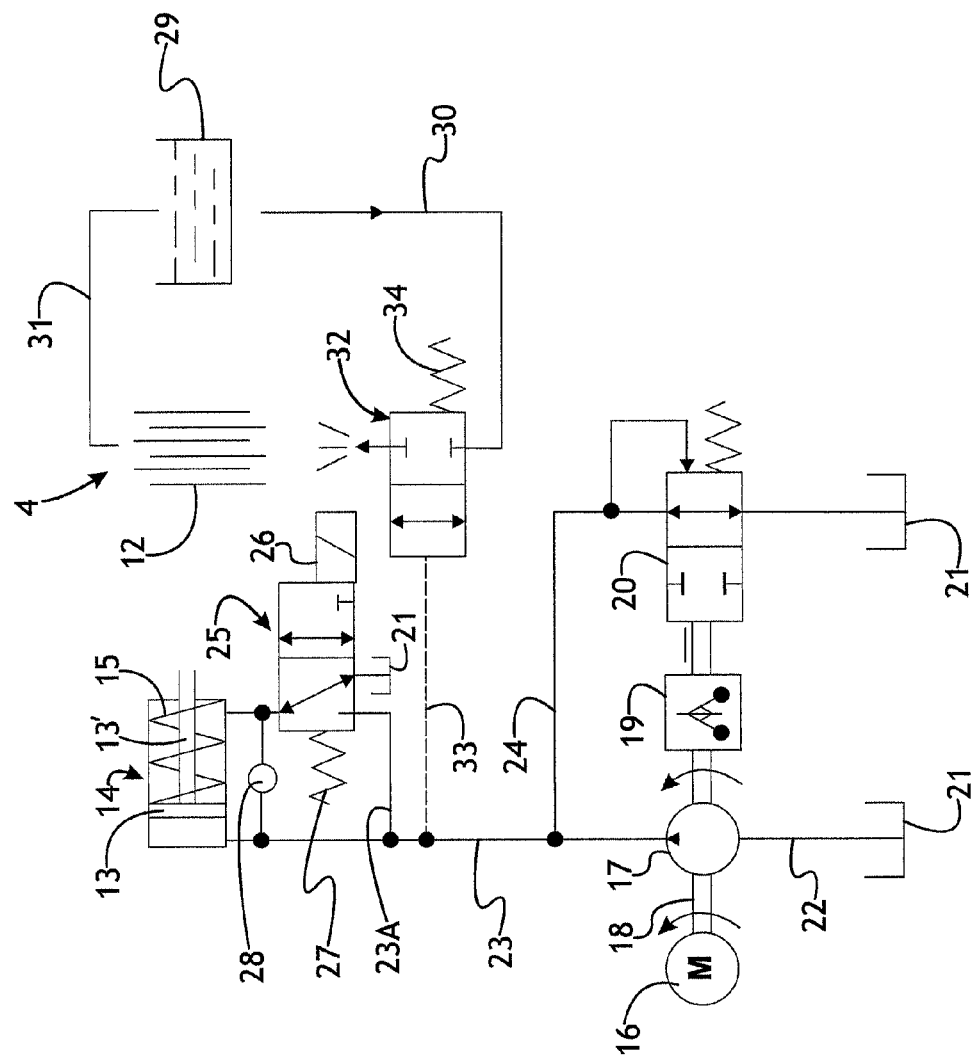
FIG. 3 shows a hydraulic scheme for the coupling provided with a shut-off valve.

FIG. 3 is an overall illustration of the hydraulic means for actuating or controlling the disc coupling 4. Reference is made to WO 2011/043722 for a full description of the actuating means.

The coupling 4 comprises a disc package 12 actuated by means of a piston 13 received in a cylinder 14. The piston 13 has a piston rod 13'. When the piston 13 is actuated by means of hydraulic pressure, the discs of the disc package 12 will get into contact with each other and establish driving contact between the two shafts to which they are connected. There is a return spring 15 of the compression type to bring the piston 13 back to its initial position, when the hydraulic pressure on the piston decreases.

An electric actuator motor 16 drives an actuator pump 17 via a drive shaft 18, which also drives a centrifugal regulator 19. The position of the centrifugal regulator 19 controls the position of and flow through a pressure overflow valve 20.

Hydraulic oil for the hydraulic actuator system is contained in a reservoir 21. It is sucked into the pump 17 through a hydraulic line 22 and is delivered therefrom towards the cylinder 14 through a main hydraulic line 23. Depending on the position of the centrifugal regulator 19 and thus the pressure overflow valve 20, a portion of and sometimes all of the hydraulic flow is diverted through a hydraulic line 24, through the overflow valve 20 and back to the reservoir 21. The result is that the hydraulic actuator pressure delivered to the cylinder 14 is governed by the centrifugal regulator 19.

By the provision of the pressure overflow valve 20, creating an overflow of excess oil back into the reservoir 21, the actuator motor 16 may be constantly running and will hereby have a very short reaction time to build up pressure in the system when needed, as it is already running, and thus less energy will be spent for accelerating rotating parts.

Under normal operation conditions, when there is no need to have the coupling 4 engaged, the actuator motor 16 is running at a rotational speed below that at which the pressure overflow valve 20 closes. When there is a demand for engaging the coupling 4, i e for actuating the piston 13, a high current/voltage is supplied to the actuator motor 16. The speed of the drive shaft 18 will go up, whereby the overflow valve 20 will be closed by the centrifugal regulator 19. Conversely, if the rotational speed of the motor drive shaft 18 is lowered, the overflow valve 20 will be opened.

This system may be called a pump actuator system, as opposed to an accumulator system. In this system the controlled actuator pressure is created and delivered by a pump, whereas in an accumulator system the controlled actuator pressure is delivered from an accumulator charged by a pump.

When the FWD mode for the vehicle is to be accomplished, either at will by the driver or by software in the vehicle, the hydraulic pressure in the cylinder 14 is decreased, so that the return spring 15 disconnects the coupling 4 by separating its discs 12.

As already stated, the operational condition of the coupling 4 shall be resumed very quickly after a disconnection as described, say within 0.4-0.5 s or less.

In a normal pump actuator system as described it would be difficult to reach the desired connect times after a disconnection, even if the pump displacement is increased several times in comparison with the needs at normal operation.

The problem with the low connect times can be solved by reducing the effective piston area during the connect phase as is described below.

A 3/2 directional solenoid valve 25 is arranged in a hydraulic line 23A from the main hydraulic line 23 to a closed compartment of the cylinder 14 behind the piston 13. The valve 25 has a solenoid 26 for its operational movement to the left in the drawing and a compression spring 27 for its return movement. In the drawing the valve 25 is in its normal or idle position assumed at AWD operation of the coupling 4, and the solenoid 26 is energized for obtaining the connect mode after a disconnect mode. In this position, hydraulic oil is submitted through line 23 to the front side of the piston 13 but also through line 23A to the back side of the piston 13. By the presence of the piston rod 13' at the back side of the piston 13 the result will be an effective piston area of some 15% in comparison with the area of the piston 13 in normal AWD operation. With a smaller area the required amount of hydraulic oil in the connect mode will be greatly reduced, and the piston travel will be faster to the "kiss point" between the discs 12 in the coupling 4. Also, the regulating pressure will be higher, say 30-80% of maximum pressure, and accordingly the percentage pressure/torque accuracy will be much higher, as desired.

During the movement of the piston 13 to the right in the drawing in the connect mode hydraulic oil will have to be transferred from the back side to the front side of the piston. This is illustrated in FIG. 3 by a check valve 28 between the lines 23 and 23A. However, for obtaining a minimal restriction of the oil flow, it is preferred to arrange one or more check valves in the piston 13 itself.

In the valve position shown in FIG. 3 the back side of the piston 13 is drained to the reservoir 21 through the valve 25.

The illustrated coupling 4 may be provided with a gravity lubrication system. For cooling and lubricating the discs 12 of the coupling 4, hydraulic oil may be submitted by gravity from a hydraulic side reservoir 29 through a line 30 during operation. By forces created by rotating parts in the coupling 4, the oil will be forced back to the side reservoir 29 through a line 31. A shut-off valve 32 may be arranged in the line 30 for cutting off the supply of oil through the line 30 in the disconnect mode of the coupling 4 in order to reduce drag torque from the oil in the coupling. This valve 32 is operated by the hydraulic pressure in the line 23 through a line 33 and by a return spring 34.

Figure 4:
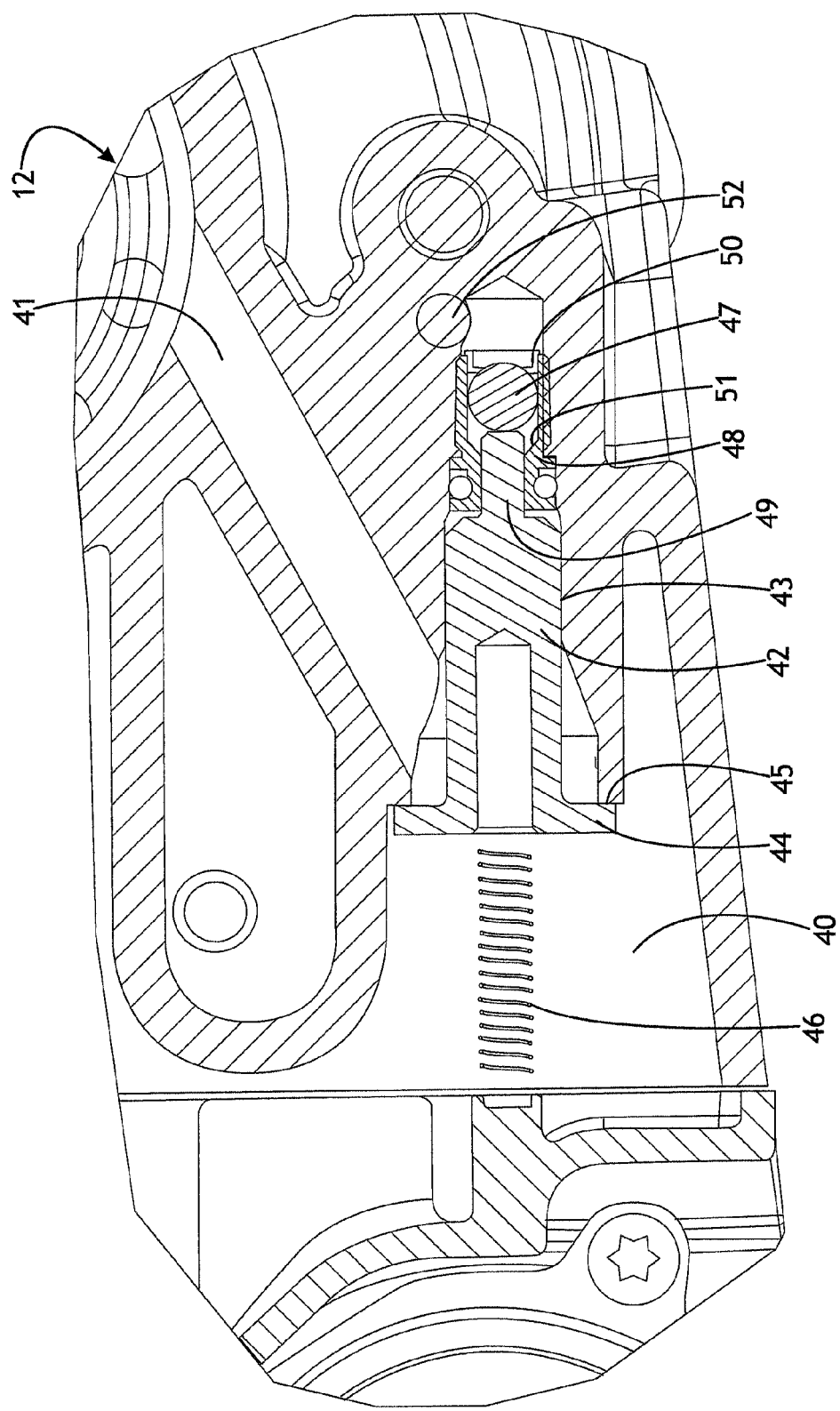
FIG. 4 is a cross section through a portion of an AWD coupling with a shut-off valve according to the invention in a closed position.

The present invention is concerned with the design of the shut-off valve 32. Reference is first made to FIG. 4, showing the valve in the same position as in FIG. 3, namely closed by spring force, corresponding to a disconnect mode of the coupling 4.

The cross section of FIG. 4 is from a lower part of the housing for the coupling 4 with the disc package 12 in the upper part to the right.

A housing compartment 40 is in contact with the side reservoir 29 (FIG. 3) and thus contains hydraulic oil. A bore 41 connects the compartment 40 with the disc package 12 for the supply of cooling and lubricating oil. The bore 41 can be closed-off from the compartment 40 by means of the valve according to the invention, corresponding to the valve 32 in FIG. 3.

The valve has a valve member in the form of a slide 42, axially movable in a valve bore 43 in the housing. The slide 42 has a transverse valve flange 44 to be applied against a valve seat 45 in the housing around the bore 41. The application force is provided by spring force, preferably by a compression spring 46 supported by the housing. This spring 46 corresponds to spring 34 in FIG. 3.

The valve opening movement of the slide 42 to the left in the drawing against the force of the spring 46 is actuated by a ball 47. This ball 47 is movably arranged in a ball cage 48, threadingly and sealingly received in the bore 43. The ball cage 48 has a center hole for a control pin 49 of the slide 42 in contact with the ball 47. For keeping the ball 47 within the ball cage 48, the latter is to the right in the drawing provided with a stop ring 50.

The ball 47 has a slightly smaller diameter than the cross-sectional diameter in the ball cage 48 and is—when moving to the left in the drawing—applied against a ball seat 51 in the ball cage 48.

The movement of the ball to the left in the drawing is controlled by oil pressure supplied through a housing bore 52, corresponding to the hydraulic line 33 in FIG. 3.

Figure 5:
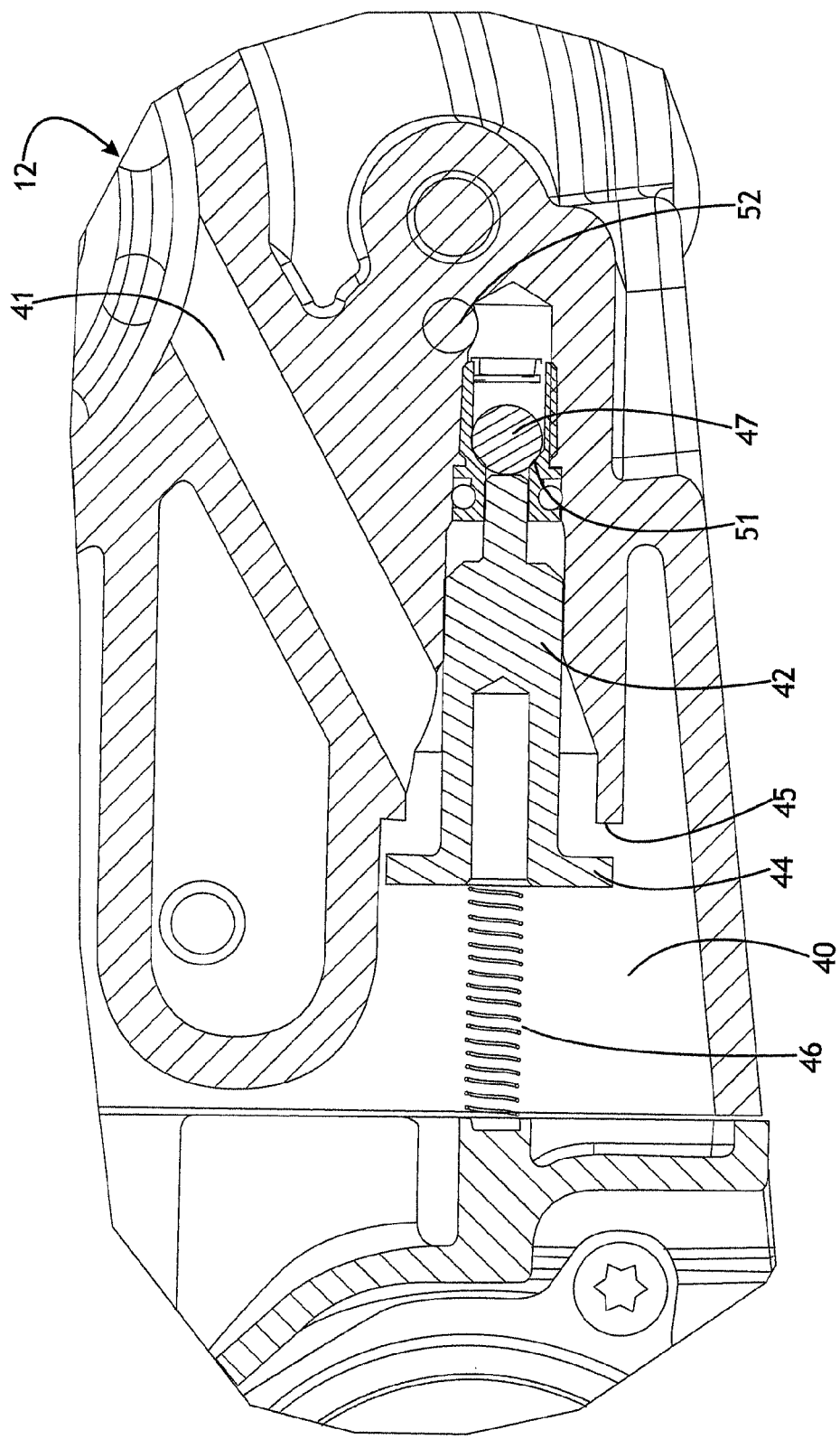
FIG. 5 is the same cross section with the valve in an open position.

FIG. 5 corresponds to FIG. 4 but shows the shut-off valve in an open position with the ball 47 engaging the ball seat 51 under the hydraulic pressure supplied through the housing bore 52. The ball 47 has pushed the slide 42 to the left in the drawing against the force of the spring 46, so that the valve flange 44 has been lifted from the valve seat 45 establishing connection between the housing compartment 40 and the housing bore 41 to the disc package 12.

The shut-off valve according to the invention provides a number of advantages:

There are no sealing frictions, which means that the return spring 46 may be weaker and provide less counter-force and that the minimum pressure level will go down.

By using a ball a leakage system will be obtained, when the valve I opened and the ball has reached its ball seat.

The diameter of the ball can be kept small, leading to a much reduced consumed control volume, in practice without relevance.

Modifications are possible within the scope of the appended claims, for example that the shut-off valve is arranged as a separate entity outside the coupling itself.

Although the shut-off valve has been shown and described in its use in a hydraulic disc coupling for an AWD coupling, other similar uses for supplying cooling and lubricating oil in units in the drive line of a vehicle may be envisaged and are to be seen as included in the scope of the appended claims. Examples of such other units are transfer cases and final drives.

What is claimed is:

1. A hydraulic disc coupling for an AWD vehicle, the coupling having means for supplying cooling and lubricating oil to a disc package of the coupling, the means including a shut-off valve for shutting-off supply of cooling an lubricating oil when the coupling is -disengaged and reestablishing the supply when the coupling is engaged, wherein the shut-off valve comprises an axially movable valve slide, provided with a transverse valve flange for cooperation with a fixed valve seat, the slide being actuatable in a closing direction by spring force and in an opening direction by a hydraulically operated ball, having an actuation end position in a sealing ball seat.

2. A hydraulic disc coupling according to claim 1, wherein the valve slide has a control pin for engagement with the ball.

3. A hydraulic disc coupling according to claim 2, wherein the control pin extends into a ball cage.

4. A hydraulic disc coupling according to claim 3, wherein the ball opposite the control pin can be acted on by hydraulic pressure supplied through a housing bore.

5. A hydraulic disc coupling according to claim 1, wherein a compression spring is arranged to act on the valve slide in an axial direction.

6. A hydraulic disc coupling for an AWS vehicle, the coupling having means for supplying cooling and lubricating oil to a disc package of the coupling, the means including a shut-off valve for shutting-off supply of cooling and lubricating oil at will, wherein the shut-off valve comprises an axially movable valve slide, provided with a transverse valve flange for cooperation with a fixed valve seat, the slide being actuatable in a closing direction by spring force and in an opening direction by a hydraulically operated ball, having an actuation end position in a sealing ball seat, and wherein the ball seat is arranged in a ball cage, threadingly engaged in a housing bore, in which the valve slide is arranged.

7. A hydraulic disc coupling according to claim 6, wherein the ball cage is provided with a stop ring for holding the ball in the ball cage.

* * * * *